May 1, 1956 M. KRAMCSAK, JR 2,743,971
SEALED WHEEL MOUNTINGS
Filed May 28, 1952 3 Sheets-Sheet 1

INVENTOR
M. Kramcsak Jr.
BY
Rockwell Bartholow
ATTORNEYS

May 1, 1956  M. KRAMCSAK, JR  2,743,971
SEALED WHEEL MOUNTINGS
Filed May 28, 1952  3 Sheets-Sheet 2
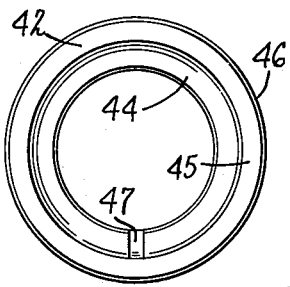
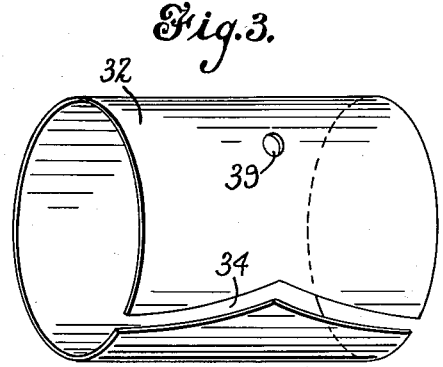
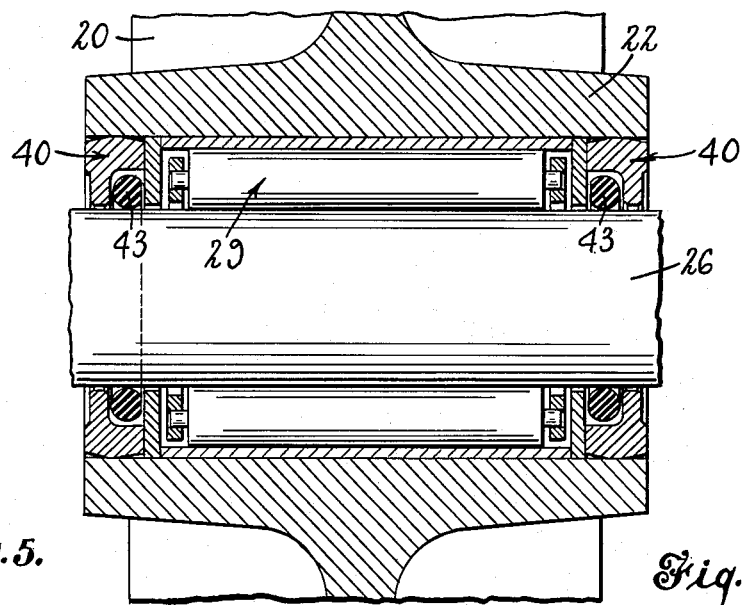
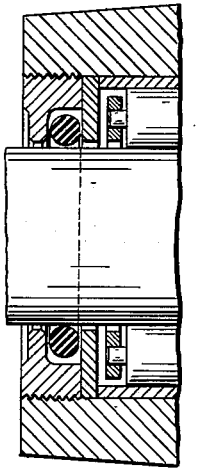
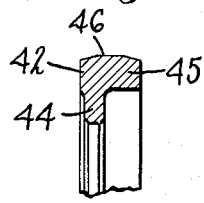
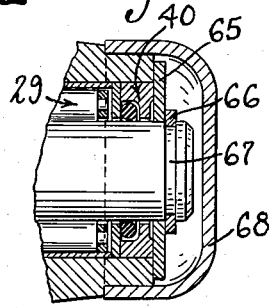
INVENTOR
M. Kramcsak, Jr.
BY
Rockwell & Bartholow
ATTORNEYS May 1, 1956  M. KRAMCSAK, JR  2,743,971
SEALED WHEEL MOUNTINGS
Filed May 28, 1952  3 Sheets-Sheet 3

INVENTOR
M. Kramcsak, Jr.
BY Rockwell & Bartholow
ATTORNEYS

United States Patent Office 2,743,971
Patented May 1, 1956

2,743,971

SEALED WHEEL MOUNTINGS

Michael Kramcsak, Jr., Bridgeport, Conn., assignor to The Bassick Company, Bridgeport, Conn., a corporation of Connecticut Application May 28, 1952, Serial No. 290,491

10 Claims. (Cl. 308—187.1)

This invention relates to sealed wheel mountings, and more particularly to provisions for sealing the bearings of caster wheels and like wheels against the ingress of dirt, water or steam, as may be desired. The invention is not limited, however, to use for this particular purpose, as it is well adapted to other purposes and other environments.

In wheel bearings it has been common practice in the past to employ O-rings for sealing purposes, but in many cases the use of O-rings intended for the sealing function has had the effect of setting up very objectionable friction owing to the manner in which the O-ring was installed; in other words, there would be highly objectionable friction between the O-ring and one or more of the adjacent parts of the bearing, which would shorten the life of the bearing or cause other trouble.

One of the objects of the present invention is to provide a very effective and satisfactory seal characterized by the fact that no objectionable friction occurs.

Another object is to provide an improved wheel bearing which is of very simple structure and has relatively few parts, and one which can be readily assembled and disassembled.

Another object is to provide a novel and improved cooperative arrangement between a roller bearing for the wheel and sealing structures employed at the respective sides of the wheel.

In the accompanying drawings:

Fig. 2 is a detail view of one of the end plates looking toward the inner face;

Fig. 3 is a perspective view of the liner for the wheel hub;

Fig. 3A is a fragmentary transverse section of one of the end plates;

Fig. 4 is a partial vertical sectional view showing a modified form of wheel mounting;

Fig. 5 is a sectional view showing a further modification; and

Figure 1:
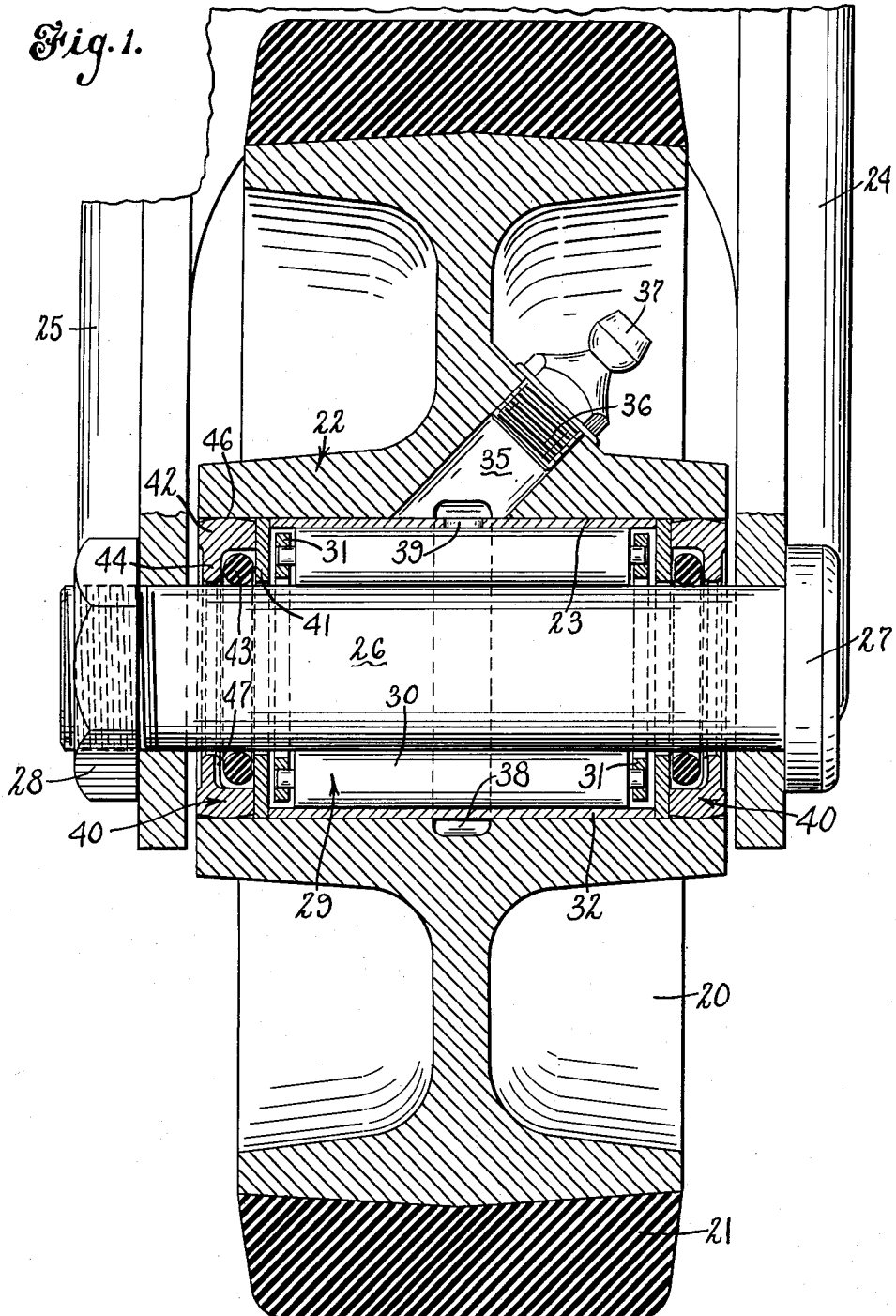
Fig. 1 is a central vertical section through a wheel mounting embodying my improvements, this particular wheel being a caster wheel.

Figs. 6 to 11, inclusive, are additional vertical sectional views showing other modifications.

In the wheel mounting shown in Figs. 1 to 3A, inclusive, the wheel selected for illustration is a relatively large caster wheel turning on a bearing that is mounted on an axle supported at its ends in a caster horn of the usual type. The axle has an integral head at one end overlying the corresponding leg of the horn, and at the opposite end is equipped with a nut that screws up against the face of the other horn leg. The wheel hub is hollowed out to provide a cylindrical bore, and within this bore is a roller bearing of what is termed the Hyatt type, having parallel rollers that are removably supported in end rings, which end rings provide in effect a supporting cage for the rollers. The roller bearing takes up only a part of the length of the wheel hub bore, and within the ends of the wheel hub bore are provided sealing structures, the details of which will hereinafter appear.

In the drawings, the wheel 20 is a metal wheel equipped with a rubber composition tread 21 and having a hub 22 provided with a cylindrical bore 23. The caster horn legs are shown respectively at 24 and 25, and the axle mentioned above is shown at 26. The head integral with the axle at one end is shown at 27, and the nut at the opposite end is shown at 28. The roller bearing previously mentioned is indicated at 29, the same having the elongated rollers 30 and the perforated rings 31, the perforations of the rings receiving in this case the trunnions at the ends of the rollers. The rollers impinge at their inner surfaces against the outer surface of the axle, and at their outer surfaces against the inner surface of a liner 32.

The liner 32 employed in the present structure is a thin, resilient C-member such as shown in Fig. 3, which can be compressed and forced into the hub bore to take the position shown in Fig. 1, in which position the liner is very effectively held against endwise displacement. Before assembly, the liner is in the condition shown in Fig. 3. Preferably, as shown in Fig. 3, the gap between the respective ends of the liner, indicated at 34, is in the form of a wide and shallow V. By providing this feature, one end locks into the other when the liner is compressed so as to prevent distortion of the liner under the effects of pressure in an axial direction.

The construction shown in Fig. 1 is one in which additional liubicant can be forced into the wheel hub and bearing from time to time, and for this purpose an inclined lubricant duct 35 is provided in the wheel hub, closed at its outer end by means of a screw plug 36 with which is associated a valved lubricant fitting 37 to which a sutable grease gun can be applied. The inner end of the duct 35 communicates with an annular groove 38 provided at the intermediate part of the hub bore around the liner, and the liner is provided with one or more holes 39 which permit the lubricant to move to and over the rollers 30.

Between each end (axially) of the liner and the adjacent end of the hub bore is located a sealing device, generally indicated at 40, and as, in this form being described, the two devices are of identical structure, a description of one will suffice. Each of these sealing devices has three parts, viz., an inner part 41 adjacent the end of the liner and in the nature of a washer, an outer part 42 in the nature of an end plate, and an intermediate part 43 which is an O-ring preferably of round cross section, made of suitable material such as oil-resistant rubber, and tightly embracing a portion of the axle.

It will be noted from Fig. 1 that the liner 32 is somewhat longer than the roller bearing 29, including the cage, so as to afford the roller cage a certain amount of end clearance. It will also be noted that the washer 41 is abutted against the end edge of the liner at the peripheral portion of the washer, whereby movement of the washer in an axially inward direction is limited and the clearance of the roller cage within the liner maintained.

As regards the outer and inner diameters of the washer 41, it should be noted that the inner diameter is such as to afford clearance with respect to the axle, and preferably also the outer diameter of the washer has a loose fit in the wheel hub inasmuch as the end plate 42, as hereinafter described, is of a structure such that it will hold the washer in its proper place against the end of the liner. The opening of the washer which has clearance with respect to the axle enables lubricant introduced into the central part of the hub to move along the axle toward the O-rings.

The end plate 42 is preferably a molded part made of powdered metal, but in some cases it can be made of other material. When made of powdered metal it is relatively easy to have the inner and outer diameters perfectly concentric. It is also possible to incorporate with the metal powder a certain amount of lubricating material so that when a certain temperature is reached the plate will exude lubricant. The plate preferably has the profile shown in Figs. 1 and 3A, that is to say, it has a relatively thin annular web 44 adjacent the axle integrally joined to a thick rim 45, the rim 45 being at least for the greater part in the form of a flange that extends toward and is adapted to abut the washer 41. Preferably the web 44 is offset somewhat from the outer face (axially) of the rim, as shown in the drawings, this being for the purpose of relieving the web from strain when the end plate is forced into place by engagement of a suitable tool with the rim. Otherwise there might be a possibility of breaking the rather thin web of powdered metal. The inner diameter of the web is such that there is a slight clearance between the web and the axle. At its radially outer part the rim 45 has a cylindrical surface 46 of substantial area adapted to engage the hub bore to hold the end plate securely therein by a press fit and preferably, as indicated in Fig. 3A, lead-in tapers are provided on the rim at the respective sides of this cylindrical portion.

It will be observed that when the sealing structure is in place against the end of the liner, the O-ring is located in an annular chamber between the end plate and the washer. The ring has a press fit with respect to the axle so that the space at the inner side is closed off or sealed, but at the three other sides of the ring there is clearance, namely, between the ring and the end plate web, between the ring and the end plate rim, and between the ring and the washer. As in this particular case the axle and ring are stationary and the members 41 and 42 rotate with the wheel, there is no friction between either of the members 41 and 42 and the O-ring. Yet there is a very effective and satisfactory sealing effect owing to the fact that the O-ring chamber is filled with grease or other lubricant that forms a coating or film on the external portions of the O-ring that prevents or inhibits the by-passing of the O-ring by water, steam, dust, dirt, and the like, moving from the ends of the wheel hub in an axial direction toward the bearing rollers.

As, in the case shown, the bearing is supplied with additional lubricant from time to time by use of the fitting 37, it is desirable to provide for the escape of excess lubricant from the wheel. In the present case a small clearance groove 47 is provided in the axially inner face of the web 44, this being a radial groove which leads across the face of the web and is adapted to carry excess lubricant to the inner edge of the web so that it can escape by movement lengthwise of the axle. Were it not for the provision of such escape or relief means, there might be in some cases a tendency to build up in the bearing sufficient pressure to displace one or more of the sealing members, but this is avoided where the structure is as above described.

It is believed that the manner of assembling the bearing structure will be obvious from the preceding description. It is apparent, of course, that the first assembly step is the placing of the liner in position in the wheel, this being followed by the introduction of the roller cage. The washers 41 are then placed in position, this being followed by the placing in position of the O-rings and the end plates, the O-rings being if desired coated with grease and the end plates being driven into the ends of the hub bore so as to position the washers tightly against the ends of the liner. The wheel is then placed in position between the legs 24 and 25 of the horn, and the axle inserted into position in the horn and wheel hub. As an incident of this operation the axle is forced through the O-rings which are thereby distended to a certain degree so that they have a force fit with the axle.

The form shown in Fig. 4 is quite similar to the form previously described, but in this case the bearing is of the permanently lubricated type, i. e., one which is sealed for life. Consequently there is no lubricating fitting provided in association with the wheel hub, and it is unnecessary to provide the end plates with means providing for the escape of excess lubricant, as in the case first described. It is understood that the bearing of the Fig. 4 form is securely sealed against the escape of lubricant as well as against the ingress of extraneous matters. The form first described also seals the bearing in both directions axially except when an excess of pressure is developed within the structure by the addition of lubricant.

In Fig. 5 a further modified form is illustrated. In this form the end plate does not have a press fit with the wheel hub, but is provided with screw threads at its radially outer part, which threads engage corresponding threads in the hub bore.

Figure 6:
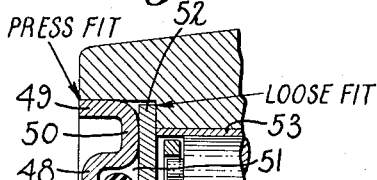

In the modification shown in Fig. 6, the end plate, instead of being made of powdered metal, is made of sheet metal. This end plate, indicated at 48, as before has a press fit with the wheel hub. The radially outer part of the plate is bent to form a trough facing toward the end of the hub, the trough having a side wall 49 that has a press fit in the hub. The trough also has a bottom 50 of substantial area engaging a face of the washer. The formation of the end plate is such as to provide an annular chamber 51 accommodating the O-ring, the arrangement being such that the O-ring can be covered on three sides with a grease film as before. As in the forms previously described, the washer 52 does not have a press fit with the hub. In this particular case, however, the washer is of somewhat greater diameter than the liner 53.

Figure 7:
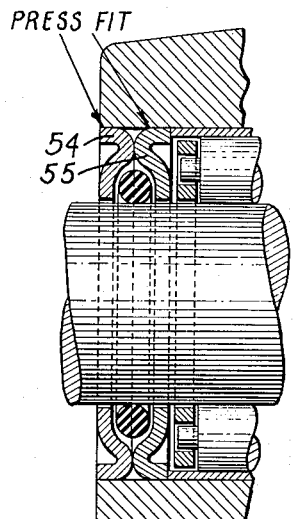

In the form shown in Fig. 7, the two members between which the O-ring is confined are of identical cross section, each being a sheet metal piece with a trough-like peripheral portion so shaped as to provide for the press fit in the hub and for the enclosure of the O-ring on three sides in a space that can contain lubricant. In this view the end plate 54 is reversely positioned with respect to the member 55 which serves the function of a washer. The members 54 and 55 are dished members abutted back to back to provide the chamber for the O-ring.

Figure 8:
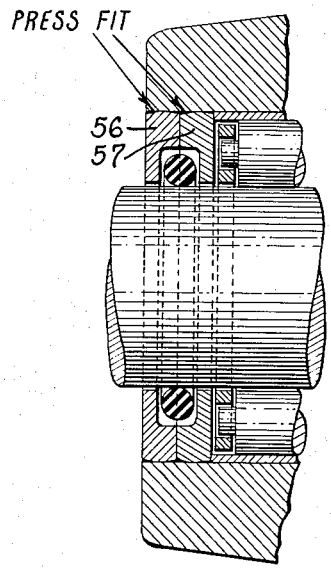

In the form shown in Fig. 8, the principles are similar to those of the Fig. 7 structure. Here, however, the end plate 56 is of powdered metal and has an axially inwardly extending rim, and a member 57 which acts as a washer is of powdered metal and has an axially outwardly extending rim abutting the rim of member 56 and providing with member 56 the chamber for the O-ring.

Figure 9:
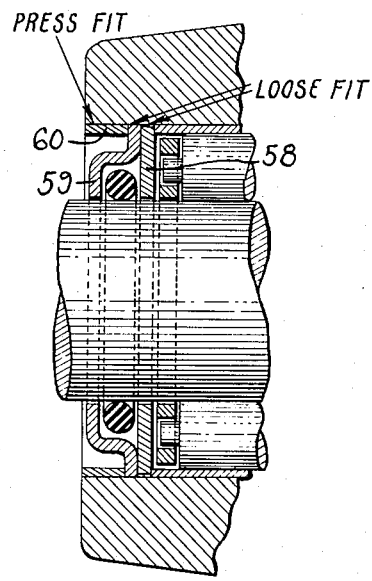

In the form shown in Fig. 9, the washer 58 is similar to that of the first form, but the end plate structure includes a sheet metal member 59 providing an annular cross section that includes a peripheral part offset axially inwardly with respect to a web part. The peripheral part of this member 59 may have a somewhat loose fit in the hub bore, and for holding the member 59 properly in position an annular sheet metal member 60, having a press fit with the hub bore, is employed.

Figure 10:
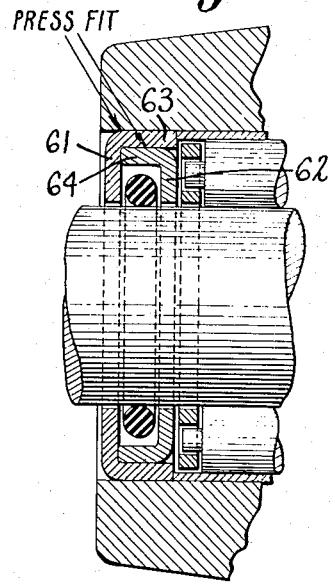

In the form shown in Fig. 10, a sheet metal member 61 serves as an end plate and a sheet metal member 62 serves as a washer. In this case, however, the member 61 has an axially inwardly turned rim 63 which abuts the end of the liner. The member 62 is of less diameter than the member 61, and member 62 is provided at its periphery with a forwardly turned flange 64 which abuts the rear face of the member 61, and lies against the radially inner face of the flange 63 in close contact therewith.

One of the prime advantages of the present invention is that wearing of the rubber ring from friction and other causes is reduced to such an extent that the period in which the bearing requires no attention is greatly extended in comparison to prior bearings. Moreover, the structure is quite simple and employs a minimum number of parts. In case the replacement of the rubber ring becomes necessary, this can be done easily by manipulation from the end face of the wheel hub. The structure is also very easy to assemble. The inner member or so-called washer which incloses the O-ring at the inner side has the double function of limiting the end play of the roller bearing and of confining the O-ring from one side in the proper position axially of the structure. The end plate can be easily installed and removed, but when once installed it holds the washer member in place very securely. The liner when constructed in the particular manner herein described presents end supporting surfaces for the sealing devices, which surfaces are accurately perpendicular to the bearing axis.

In the modified form shown in Fig. 11 there is illustrated a construction that can be used advantageously where the wheel is rotatably mounted upon the end portion of a shaft, as, for example, where the wheel is placed at the end of a stationary axle of a vehicle. In this case a retaining washer overlies the end plate and the end face of the wheel hub, and a snap ring may be used for holding the washer in position, the snap ring being engaged in a groove in the shaft. In Fig. 11 the end washer is indicated at 65, the snap ring at 66, and the groove receiving the snap ring at 67. Over the end of the shaft and the end of the hub a suitable cap 68 may be mounted in any suitable manner. At the opposite side of the wheel, another end washer and another snap ring (not shown) may be employed to hold the wheel against displacement in the opposite direction.

While a number of different forms are disclosed by way of example, it is to be understood that various other modifications may be used and various changes made in the details without departure from the principles of the invention or the scope of the claims.

What I claim is:

1. In a wheel mounting, the combination of a wheel hub having a longitudinal bore of uniform section for the greater part of its length, a resilient compressible thin walled liner of less length than the hub held in place in the intermediate portion of said bore and adapted for containing a supply of lubricant, an axle located in said bore, anti-friction rollers of less length than said liner arranged between the liner and the axle, an O-ring stretched over the axle so as to be in tight contact with an axle portion disposed axially outwardly of an end of said liner, a washer having a radially outer part abutting the adjacent end of the liner, said washer having a clearance aperture for the axle which clearance aperture enables lubricant to move along the axle toward the O-ring, and an end plate rigidly fixed within the end of said bore beyond said washer so as to turn with the wheel, said end plate and said washer in cooperation with each other presenting a chamber in which said O-ring is accommodated with clearance at the sides and at the outer periphery, whereby lubricant may form a dust-blocking coating over the sides and the outer periphery of the O-ring, said end plate having a thin radially inner part and a thick radially outer rim secured in the bore and abutting the washer, and said end plate being provided with an axle-receiving opening of greater diameter than the axle but of substantially less diameter than the outer diameter of the O-ring, thereby providing a constricted opening through which lubricant may escape from said chamber.

2. In a wheel mounting, the combination of a wheel having a longitudinal bore open at the ends, a fixed axle extending through the bore, a liner rigidly held in position relatively to the wheel in the intermediate part of the bore and terminating short of the bore ends, a lubricated roller bearing between the liner and the axle of less overall length than the liner so that it can have end clearance within the liner, and an assembly serving as a sealer fixed in and closing the end of the bore, said assembly comprising a washer contacting the adjacent end of the liner, an outer plate having a radially outer part contacting the washer to hold it in position and having a radially inner part axially spaced from the washer to provide an annular chamber, and an elastic sealing ring stretched over the axle to fit it tightly and located within said chamber with clearance between the ring and the chamber walls to receive a coating of grease, said outer plate comprising a relatively thick radially outer rim and a thin web, said thin web having on its axially inner face an escape groove for the lubricant.

3. In a wheel mounting, the combination of a wheel hub having a longitudinal bore, a fixed axle located in the bore and extending beyond the bore ends, a lubricated anti-friction bearing comprising rollers intermediate the hub and the axle inwardly of the bore ends, and a sealing device in one end of the bore comprising an O-ring fast on the axle to prevent lubricant passing between it and the axle and axially outer and inner members turning with the hub and enclosing the O-ring, the axially inner member being a washer having a clearance opening for the axle and the axially outer member being rigidly fixed to the hub within the bore, said members providing between them an O-ring chamber providing clearance at opposite sides of the O-ring and at the outer periphery of the O-ring so that said members when the wheel is rotated are out of contact with the O-ring, whereby the O-ring is freed from frictional wear, said outer member having on its axially inner face an escape groove for lubricant.

4. In a wheel mounting, the combination of a wheel having a hub provided with a longitudinal bore communicating with a radial inlet for lubricant intermediate the ends of the bore, a fixed axle extending through the bore, a lubricated antifriction bearing element in the bore intermediate the hub and the axle, an end plate closing one end of the bore and rigidly secured to the hub, a washer axially inwardly of the end plate through which the axle extends with clearance permitting passage of lubricant along the axle toward the end plate, said end plate and said washer being in abutment in the radially outer part of said bore and providing between them in a location adjacent the axle surface a clearance space for an O-ring on the axle, and an O-ring of elastic material stretched over and frictionally held on the axle in said clearance space and having clearance on all sides but the axle side so that the O-ring may be free of frictional wear and so that the O-ring may be covered with a film of lubricant to inhibit the passage of foreign matter in the direction of the bearing element, said end plate being provided with an axle-receiving opening of greater diameter than the axle but of substantially less diameter than the outer diameter of the O-ring, thereby providing a constricted opening through which lubricant may escape from said clearance space.

5. In a wheel mounting, the combination of a wheel having a hub provided with a longitudinal bore, a stationary axle extending through said bore, a lubricated antifriction bearing element in said bore intermediate the hub and the axle, and sealing elements in the respective ends of the bore each comprising axially inner and outer members providing a chamber therebetween and also comprising an O-ring fast on the axle in said chamber, said axle extending through said axially inner member with clearance thereby permitting the passage of lubricant along the axle to the O-ring, the O-ring being provided with clearance on all sides but the axle side to free the O-ring of frictional wear, and the O-ring inhibiting the passage of foreign matter toward the bearing, the axially outer member being provided with an axle-receiving opening of greater diameter than the axle but of substantially less diameter than the outer diameter of the O-ring, thereby providing a constricted opening through which lubricant may escape in an axially outward direction.

6. In a wheel mounting, the combination of a wheel having a hub with a longitudinal bore communicating with a radial inlet port for lubricant intermediate the ends of the bore, a fixed axle extending through the bore, a lubricated antifriction bearing element in the bore intermediate the axle and the hub, a pair of washers disposed in the respective end portions of the bore and through which the axle extends with clearance to permit lubricant to pass axially outwardly along the axle, a pair of end plates in the bore disposed axially outwardly of the respective washers, each end plate forming with the corresponding washer an annular chamber for receiving an O-ring, and a pair of O-rings of elastic material stretched over and frictionally held on the axle in the respective chambers and having clearance on all sides but the axle side to free the same from frictional wear, each O-ring being covered with a film of lubricant to inhibit passage of foreign matter to the bearing element, and each end plate being provided with an axle-receiving opening of greater diameter than the axle but of substantially less diameter than the outer diameter of the O-ring, thereby providing a constricted opening through which lubricant may escape from one of said chambers.

7. A wheel mounting as defined in claim 6, wherein each end plate has external screw threads engaging screw threads in one end of the bore.

8. A wheel mounting as defined in claim 6, wherein each end plate is formed of sheet metal and has a trough-like peripheral formation.

9. A wheel mounting as defined in claim 6, wherein each end plate and washer have trough-like peripheral formations and are reversely positioned in the hub bore.

10. A wheel mounting as defined in claim 6, wherein each end plate and washer have thick rims and thin webs and are positioned in the bore in reversed relationship to each other.

References Cited in the file of this patent

UNITED STATES PATENTS

| | | |
|---|---|---|
| 1,299,277 | Wilson | April 1, 1919 |
| 1,304,430 | Wickersham | May 20, 1919 |
| 1,859,436 | Durdin | May 24, 1932 |
| 1,930,626 | Schwemlein | Oct. 17, 1933 |
| 2,016,924 | Herrmann | Oct. 8, 1935 |
| 2,187,777 | Gannett | Jan. 23, 1940 |
| 2,473,139 | Dickerman | June 14, 1949 |

FOREIGN PATENTS

| | | |
|---|---|---|
| 655,577 | Great Britain | July 25, 1951 |